United States Patent [19]
Burdick et al.

[11] Patent Number: 5,096,158
[45] Date of Patent: Mar. 17, 1992

[54] OIL DRAIN VALVE ASSEMBLY

[75] Inventors: Douglas Burdick, Downers Grove; Frank V. Pliml, Arlington Heights; Michael W. Hartley, Elmhurst, all of Ill.

[73] Assignee: Illinois Tool Works Inc., Glenview, Ill.

[21] Appl. No.: 729,573

[22] Filed: Jul. 15, 1991

[51] Int. Cl.$^5$ .............................................. F16K 51/00
[52] U.S. Cl. .................................... 251/144; 251/351; 251/353; 251/904; 137/315
[58] Field of Search ................. 137/15, 315, 327, 328; 251/144, 352, 904, 351, 353

[56] References Cited

U.S. PATENT DOCUMENTS

| | | | |
|---|---|---|---|
| 1,678,927 | 7/1928 | Weatherhead, Jr. | 251/351 |
| 2,073,048 | 3/1937 | Clark | 251/149.5 |
| 3,727,638 | 4/1973 | Zaremba, Jr. et al. | 251/351 |
| 4,428,560 | 1/1984 | Erdelsley | 251/149.5 |
| 4,445,530 | 5/1984 | Meixell | 251/351 |
| 4,807,847 | 2/1989 | Martz | 251/351 |
| 4,909,478 | 3/1990 | Steer | 251/904 |

FOREIGN PATENT DOCUMENTS 1184269 7/1959 France ............................ 251/351

Primary Examiner—A. Michael Chambers
Attorney, Agent, or Firm—T. W. Buckman; J. P. O'Brien

[57] ABSTRACT

An oil drain valve assembly is provided for draining oil from an engine crankcase such as in a small internal combustion engine. The drain valve assembly includes an adaptor, an outer sleeve assembly, and interlocking for permitting opening of the valve assembly by relatively limited counter-clockwise rotation and subsequent pulling of the outer sleeve assembly relative to the adaptor. The interlocking means is formed of a pair of diametrically opposed J-slots disposed on the upper end of the outer sleeve assembly and co-mating locking pins disposed on the exterior surface of the adaptor. The locking pins are engageable with detents formed on the J-shaped slots to define a closed or sealed position.

20 Claims, 3 Drawing Sheets

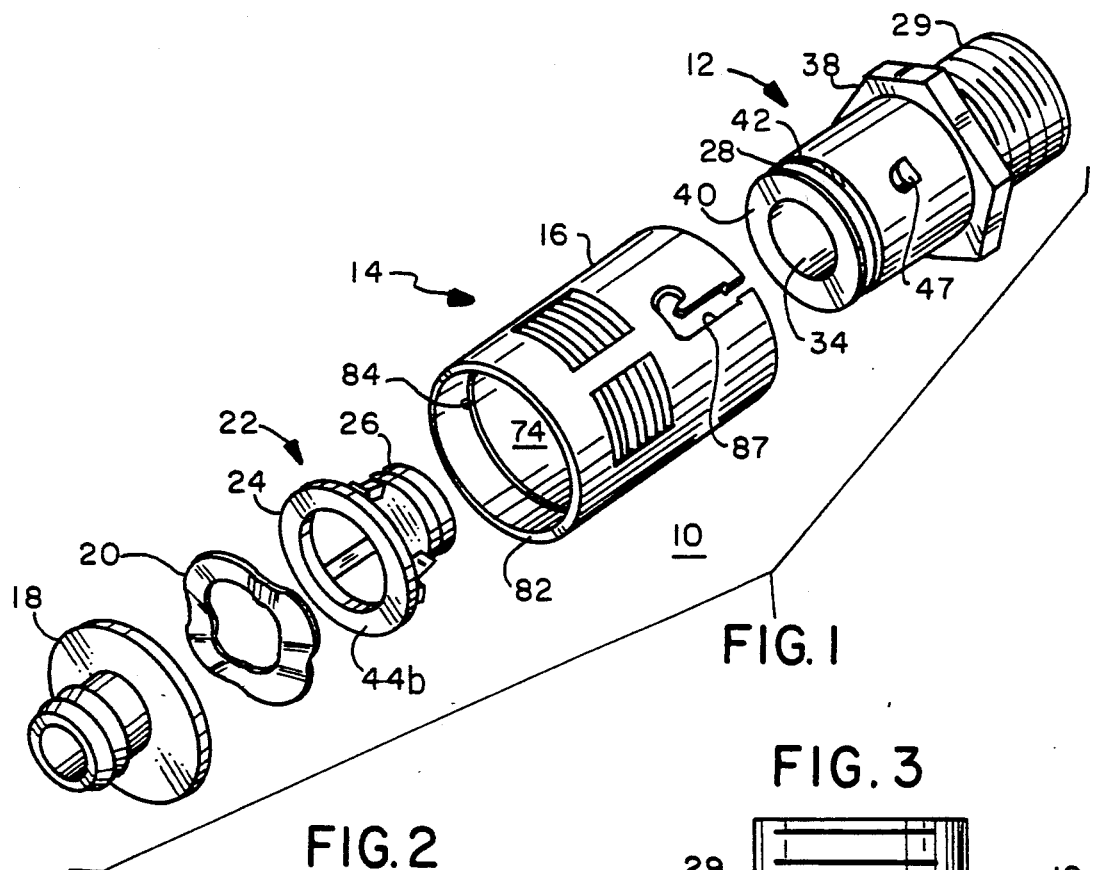
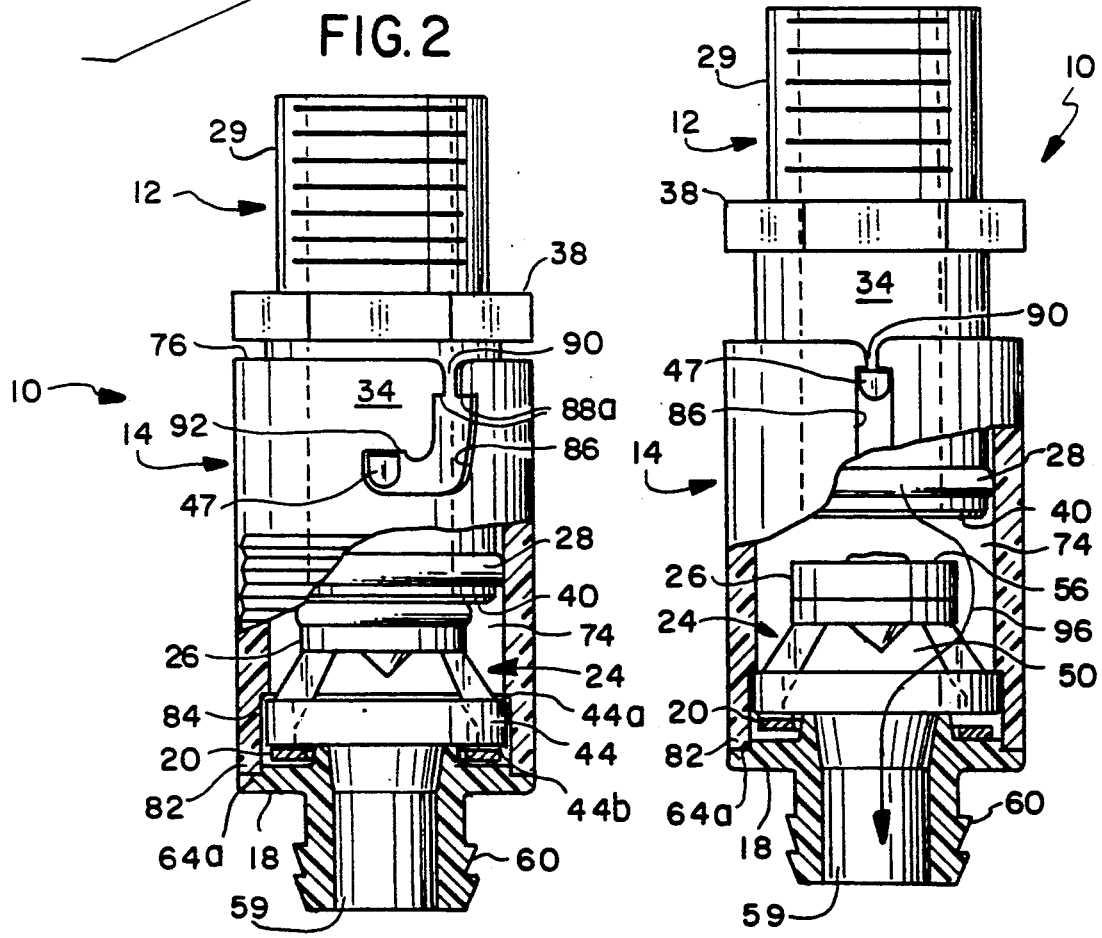

OIL DRAIN VALVE ASSEMBLY

BACKGROUND OF THE INVENTION

1. Field of the Invention:

This invention relates generally to drain cocks or valves and more particularly, it relates to an improved oil drain valve assembly which is used for draining oil from an engine crankcase of a small internal combustion engine such as those encountered on lawn and garden tractors, riding lawn mowers, snow blowers, and the like.

2. Description of the Prior Art:

As is generally known, in order to change the crankcase oil in small internal combustion engines there is typically required the procedure of unscrewing a threaded male plug received within the threaded crankcase opening, drainage of the crankcase oil therefrom, and screwing in the plug prior to refilling of the crankcase with new, clean oil. This operation, especially when practiced by the home consumer, is usually quite messy and inconvenient since it results in the oil leaking everywhere, such as all over the mower deck and subsequently the driveway.

There have been numerous attempts made in the prior art to eliminate this undesirable situation by designing drain plug assemblies which allow drainage in a more simple manner. However, these prior art drain plug assemblies have been found to be unsatisfactory since they usually are completely made of a metal material which may become quite hot at certain times and also require the use of a hand tool (wrench, pliers, etc.). In addition, these metal type drain plug assemblies of the prior art may sometimes by over-tightened into the crankcase, thereby causing physical damage thereto.

It would therefore be desirable to provide an improved oil drain valve assembly which is simple in design and operation for draining engine oil from a small combustion engine without requiring the use of hand tools. Further, it would be expedient that the oil drain valve assembly be operable by an unskilled person and which is not inconvenient and messy to use so as to avoid causing oil leaks and spills.

A prior art search directed to the subject matter of this application in the U.S. Patent and Trademark Office revealed the following U.S. Letters Patent:

| | | |
|---|---|---|
| 63,680 | 1,678,927 | 3,948,481 |
| 476,957 | 1,857,940 | 4,177,949 |
| 1,210,707 | 2,987,080 | 4,314,689 |
| 1,442,226 | 3,727,638 | 4,445,530 |
| 1,555,013 | 3,880,401 | 4,807,847 |
| 1,611,611 | | |

In U.S. Pat. No. 1,678,927 to A. J. Weatherhead, Jr. issued on July 31, 1928, there is disclosed a drain cock which is comprised of a valve member and a tubular body. The tubular body includes a screw-threaded opening and a valve seat. The valve member has a screw-threaded portion adapted to operate with the screw-threaded opening and an inner closed end engageable with the valve seat. A pair of openings is formed in the opposite sides of the valve member so as to communicate with a longitudinal bore therein to permit escape of the fluid when the valve is unseated. A handle is affixed to the opened outer end of the valve member which can be rotated so as to effect longitudinal movement of the valve member within the tubular body, thereby opening and closing the fluid passage.

In U.S. Pat. No. 3,727,638 to John P. Zaremba, Jr., et al. issued on Apr. 17, 1973, there is disclosed a liquid reservoir drain plug assembly comprised of a first tubular female plug member and a second tubular male member. The first member has a tapered top portion and is adapted to be received by a drain outlet in the reservoir. The second member is adapted to be tightly received by the first member in the tapered portion thereof. The second member has a top portion and a bottom portion, with the top portion terminating in a cone and having openings in its sides. When the second member is loosened, liquid is allowed to flow from the reservoir through the tapered portion of the first member and through the second member via the openings in its top portion.

U.S. Pat. No. 3,948,481 to Barry R. Pollock issued on Apr. 6, 1976, teaches a draincock for an automotive cooling system which includes a tubular integral body having external threads at a forward end and a through bore having internal threads at a rear end, and a valve stem having external threads in engagement with the internal body threads. The body has a radial end face which intercepts a counterbore so as to form an annular seat. A valve stem is provided with an integral handle at a rearward end and an integral head at a forward end. The stem has an axial passage extending from the head to a rearward face of the handle. The stem also has a port on its periphery communicating with the axial passage to conduct fluid from a zone surrounding the head through the stem. The stem is further provided with a conical sealing surface which is adapted to sealingly engage the annular seat.

U.S. Pat. No. 4,807,847 to Mitchell R. Martz issued on Feb. 28, 1989, teaches a valved oil pan plug for draining oil from vehicle oil pans which includes a body having a threaded stem for permanently attaching the body to the pan threaded drain hole and a valve threadedly received within the body. The valve includes a conical seat surface seating against a conical valve seat within the body bore. The valve includes an axial bore having inlet ports receiving the pan oil upon the valve seat disengaging from the body seat. This is accomplished by rotating the valve so as to unloosen and retract the same within the body bore which separates the seat surface from the valve seat.

The remaining patents, listed above but not specifically discussed, are deemed to be of only general interest and are cited to show the state of the art in drain plug assemblies.

Further, there is shown in FIG. 15 a prior art oil drain valve which is also known to the applicants of the present invention. The oil drain valve is comprised of a valve body member 2, collar 4, valve core 6, and seal 8. The valve core 6 includes an integral hose barb 3 at a remote end thereof for ease of attachment to a hose for draining. The valve core 6, which is non-rotatable, extends through the collar 4 captivating one end of the valve body member 2. The interior end of the valve core 6 is joined to the seal 8 with the valve body member 2. Movement of the collar 4 by rotation will cause sliding of the valve core 6 relative to the valve body member 2, thereby permitting the seal 8 to open and close the drain outlet 5.

None of the prior art discussed above disclosed an oil drain valve assembly like that of the present invention which includes an adaptor threaded into a crankcase opening, an outer sleeve assembly having a valve subassembly disposed therein and being adapted to telescopingly receive the lower end of the adaptor, and interlocking means formed on the upper end of the outer sleeve assembly and on the exterior surface of the adaptor for permitting opening of the valve assembly. This is accomplished by a relatively limited counterclockwise rotation and subsequent pulling of the outer sleeve assembly relative to the adaptor.

SUMMARY OF THE INVENTION

Accordingly, it is a general object of the present invention to provide an improved oil drain valve assembly with interlocking means which is relatively simple and economical to manufacture and assemble, but yet overcomes the disadvantages of the prior art drain plug assemblies.

It is an object of the present invention to provide an oil drain valve assembly which is simple in design and operation for draining engine oil from a small combustion engine without requiring the use of hand tools.

It is another object of the present invention to provide an oil drain valve assembly which is of a compact configuration, but yet allows maximum oil flow so as to facilitate quick draining of the oil.

It is still another object of the present invention to provide an oil drain valve assembly which includes interlocking means for preventing accidental opening of the valve assembly during normal operation thereof and due to engine vibrations encountered.

It is yet still another object of the present invention to provide an oil drain valve assembly which is comprised of an adaptor threaded into a crankcase opening, an outer sleeve assembly having a valve subassembly disposed therein and adapted to telescopingly receive the lower end of the adaptor, and interlocking means formed on the upper end of the outer sleeve assembly and on the exterior surface of the adaptor for permitting opening of the valve subassembly upon relatively limited counterclockwise rotation and subsequent pulling of the outer sleeve assembly relative to the adaptor.

In accordance with these aims and objectives, the present invention is concerned with the provision of an oil drain valve assembly for draining oil from an engine crankcase such as in a small internal combustion engine. The oil drain valve assembly includes an adaptor formed of first tubular fitting member and an outer sleeve assembly formed of a second tubular member. The first tubular member has an externally threaded male upper end to be received in an internally threaded outlet opening of the engine crankcase and has a first axial bore extending from the upper end to a lower end thereof. The lower end of the adaptor adjacent the first axial bore includes an annular valve seat. The second tubular member has an open upper end and a lower end. The second tubular member includes an axial passage extending between its open upper end and its lower end. The lower end of the second tubular member is closed by an integral nozzle end cap having a second axial bore extending therethrough.

The outer sleeve assembly includes a valve subassembly secured within the lower end thereof. The valve subassembly has a sealing surface and radial passageways disposed below the sealing surface for communicating with the second axial bore. The open end of the second tubular member is adapted to telescopingly receive the lower end of the first tubular member so that the sealing surface fits firmly and tightly against the annular valve seat for providing a seal. Interlocking means formed on the open upper end of the second tubular member and on the exterior surface of the first tubular member are provided to permit opening of the valve assembly by rotating and subsequent pulling of the second tubular member relative to the first tubular member so as to cause disengagement of the sealing member from the annular valve seat thereby permitting oil to flow through the first axial bore and around the sealing surface into the radial passageways and from the second axial bore.

BRIEF DESCRIPTION OF THE DRAWINGS

These and other objects and advantages of the present invention will become more fully apparent from the following detailed description when read in conjunction with the accompanying drawings with like reference numerals indicating corresponding parts throughout, wherein:

FIG. 1 is an exploded, perspective view of an oil drain valve assembly, constructed in accordance with the principles of the present invention;

FIG. 2 is a longitudinal sectional view of the oil drain valve assembly of the present invention, illustrating the valve subassembly 22 in the closed or sealed position;

FIG. 3 is a longitudinal sectional view of the oil drain valve assembly of the present invention, illustrating the valve subassembly 22 in the opened or draining position;

DESCRIPTION OF THE PREFERRED EMBODIMENT

Figure 4:
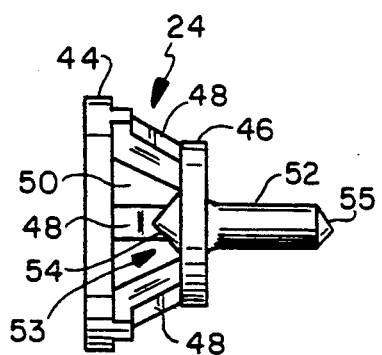
FIG. 4 is a side elevational view of the spool 24 of the present invention.

Referring now in detail to the drawings, there is shown in FIGS. 1-3 an oil drain valve assembly 10, constructed in accordance with the principles of the present invention. The oil drain valve assembly 10 is comprised of an adaptor 12 and an outer sleeve assembly 14. The outer sleeve assembly 14 includes an oil valve sleeve 16, a nozzle end cap 18, and a wave washer 20, and a valve subassembly 22. The valve subassembly 22 consists of a specially-designed spool 24 and a sealing washer 26. An O-ring 28 is disposed on one end of the adaptor 12. The adaptor 12 is formed of a tubular male fitting member having an externally threaded upper end 29 which is rotatable to be received in an internally threaded outlet opening 30 in an engine oil reservoir 32 (FIG. 14), such as a crankcase of a small internal combustion engine. The adaptor 12 is preferably formed of a non-corrosive metallic material, such as zinc.

Figure 12:
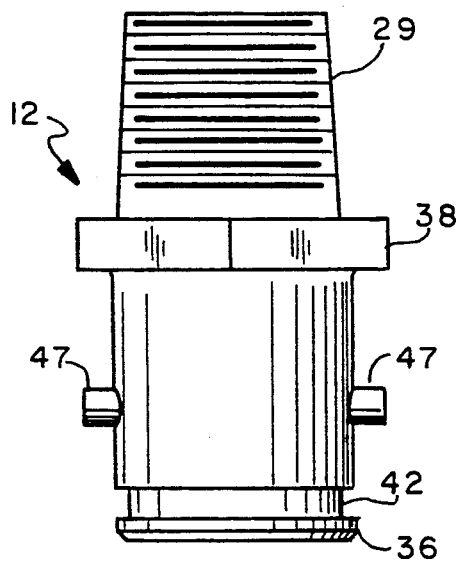
FIG. 12 is a side elevational view of the adaptor 14 of the present invention.
Figure 13:
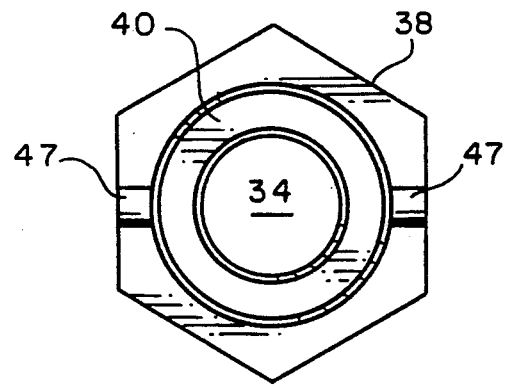
FIG. 13 is a bottom end view of the adaptor of FIG. 12.

As can best be seen from FIGS. 12 and 13, the tubular member 12 has an axial oil passage or bore 34 extending through its entire length between the upper end 29 and a lower end 36. In substantially the intermediate area on the exterior surface of the tubular member 12, there is provide preferably an integral hexagonal nut 38 which accommodates an end wrench or deep socket tool for facilitating insertion and removal of the valve assembly 10 by rotation thereof into the threaded outlet opening of the engine crankcase. The lower end 36 of the tubular male member includes an annular valve seat 40 intersecting the bore 34. Adjacent the lower end 36, the exterior surface of the tubular male member 12 is provided with the peripheral groove 42 for retaining the O-ring 28. Further, a pair of diametrically opposed semicircular-shaped co-mating locking pins 47 is provided on the exterior surface of the tubular member 12 between the hexagonal nut 38 and the lower end 36.

Figure 5:
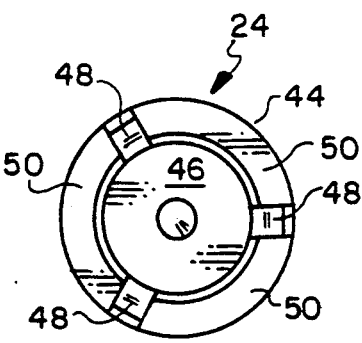
FIG. 5 is a right end view of the spool of FIG. 4.
Figure 6:
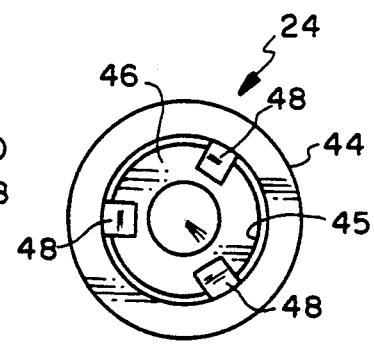
FIG. 6 is left end view of the spool of FIG. 4.

Turning to FIGS. 4 through 6, the spool 24 of the valve subassembly 22 will now be described in greater detail. The spool 24 includes an annular flange 44 having a central opening 45 and a disc-shaped member 46 spaced apart from the annular flange and joined integrally thereto by a plurality of radially extending legs 48. The diameter of the disc-shaped member 46 is less than the inner diameter of the annular flange 44. One end of each of the plurality of (three) legs 48 is integrally connected to the annular flange 44 at equally spaced intervals around its circumference (120° apart). The other end of each of the three legs 48 is integrally connected to the disc-shaped member 46. Between the adjacent legs 48, there are formed three trapezoidally-shaped openings 50 defining radial passageways extending from the annular flange 44 to the disc-shaped member 46. The radial passageways 50 are in communication and intersect the central opening 45.

The disc-shaped member 46 has an axial stem 52 extending through its center. One end 53 of the stem 52 extends towards the annular flange 44 and terminates in a short 90° point area 54 which influences laminar flow of oil through the valve subassembly 22. In other words, the area 54 prevents swirling and eddies in the oil flow as it progresses around and through the spool 24. The other end 55 of the stem 52 is adapted to receive the sealing washer 26 (FIG. 1). The sealing washer 26 is of a circular-shaped configuration and is secured fixedly around the end 55 of the stem in any suitable means such as by staking or sonic welding. As a result, the valve subassembly 22 is produced as shown in FIG. 1. The sealing washer is preferably formed of an elastomeric material and has an annular outer surface 56 defining a sealing surface for engagement with the annular valve seat 40, as will be later described.

Figure 7:
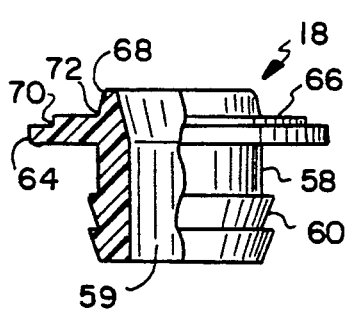
FIG. 7 is a side elevational view, partly in section, of the nozzle end cap 18 of the present invention.
Figure 8:
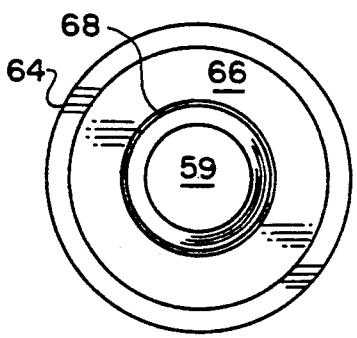
FIG. 8 is a top end view of the nozzle end cap of FIG. 7.

Referring to FIGS. 7 and 8, the nozzle end cap 18 includes a tubular section 58 having an axial bore 59 extending therethrough. The nozzle end cap has a generally Venturi configuration so as to direct and control the oil flow therethrough. Consequently, the velocity of the oil as it passes through the end cap tends to be increased so as to quickly draw the oil through the valve subassembly 22. Adjacent one end of the nozzle end cap, there are provided barbs 60 at its outer surface to which one end of a length of drain hose 62 (FIG. 14) can be easily attached to facilitate draining of the oil. The other end of the hose 62 can be connected to a waste oil reservoir 63 for receiving the waste oil.

A mounting flange 64 is formed integrally with the other end of the nozzle end cap 18. A raised portion 66 of a reduced diameter is disposed on the inner surface of the flange 64 and coaxially with the bore 59. The end of the bore 59 adjacent the raised portion 66 terminates in a cylindrical wall 68. A first shoulder 70 formed between the flange 64 and the raised portion 66 aid in joining the nozzle end cap 18 to the oil valve sleeve 16, as will be presently described. A second shoulder 72 formed between the raised portion 66 and the cylindrical wall 68 serves to receive the wave washer 20, as will also be described later in detail.

Figure 9:
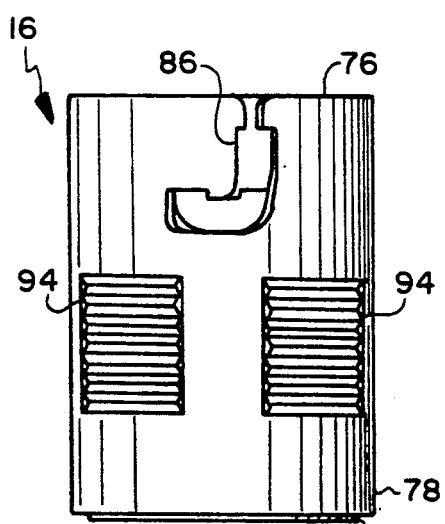
FIG. 9 is a side elevational view of the oil valve sleeve 16 of the present invention.
Figure 10:
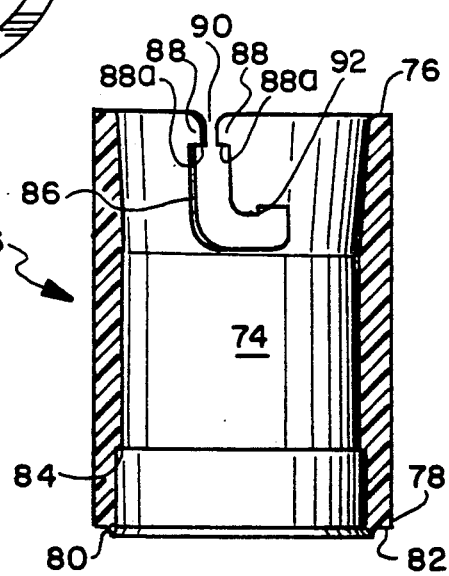
FIG. 10 is a cross-sectional view of the oil valve sleeve of FIG. 9.
Figure 11:
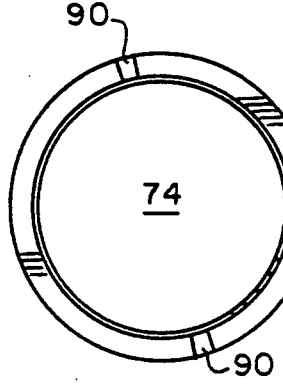
FIG. 11 is a top end view of the oil valve sleeve of FIG. 9.

With attention directed to FIGS. 9-11, there is shown in greater detail the oil valve sleeve 16. The sleeve 16 is formed of a tubular member having an axial passage or bore 74 extending from an open upper end 76 and a lower end 78. Adjacent the lower end 78, there is provided a thin cylindrical wall 80 of a reduced diameter which is slightly smaller than the outer diameter of the sleeve 16. Also, the diameter of the cylindrical wall 80 is slightly larger than the diameter of the raised portion 66 of the nozzle end cap 18 so as to be adapted to engage the first shoulder 70 thereof. An annular end surface 82 is formed radially outwardly of the cylindrical wall 80 defines the lower end surface of the sleeve 16. Spaced from the lower end 78 and disposed on the interior wall surface of the sleeve 16, there is provided a counterbore or shoulder 84 which is adapted to engage the peripheral edge 44a of the annular flange 44 of the spool.

The open upper end 76 of the sleeve 16 is provided with a pair of diametrically opposed J-shaped slots 86 which are adapted to receive the co-mating locking pins 47 on the adaptor 12 so as to define interlocking means. One end of the slots 86 adjacent the upper end 78 of the sleeve 16 is provided with opposed projections or tabs 88 defining a narrow slit 90 therebetween. The pins 47 are prevented by the tabs 88 to cause complete separation of the outer sleeve assembly 14 from the adaptor 12 during the valve operation. The other end of the slot 86 includes a hook or detent 92 which engages the pins 47 to provide a locked detent position. On the circumferential surface of the sleeve 16 in substantially its mid-portion, there are provide four equally spaced rectangularly-shaped ribbed sections 94 which may be gripped by fingers of the user to facilitate opening and closing of the valve assembly 10.

The spool 24 of the valve subassembly 22, nozzle end cap 18, and oil valve sleeve 16 are all preferably formed of a thermoplastic material, such as nylon and the like. As a result, the valve assembly 10 of the present invention will not become as hot as the oil drain plug assemblies of the prior art which were formed completely of metal. The wave washer 20 is formed preferably of a metallic material.

In order to assemble the oil drain valve assembly 10 of the present invention, the end 55 of the stem 52 of the spool is inserted through an opening in the sealing washer to produce the valve subassembly 22. Then, the end 55 of the stem will be sonically welded or staked so as to provide a positive attachment of the sealing washer 26. Next, this valve subassembly 22 is inserted into the axial passage 74 of the oil valve sleeve 16 so that the interior shoulder 84 engages the peripheral edge 44a of the annular flange 44 of the spool. The wave washer 20 is then placed into the axial passage 74 of the sleeve and comes to rest on the lower surface 44b of the annular flange of the spool. The nozzle end cap 18 is attached to the sleeve 16 so that the annular end surface 82 abuts the peripheral surface 64a of the mounting flange 64. Thereafter, the nozzle end cap is permanently secured to the sleeve 16 by a suitable means such as sonic welding to provide the outer sleeve assembly 14.

The O-ring 28 is attached to the groove 42 in the lower end of the adaptor 12. The O-ring is preferably formed of an elastomeric material or the like which provides a seal between the adaptor 12 and the axial passage 74 of the sleeve 16, thereby preventing oil leaking therebetween during the open or draining position of the valve subassembly (FIG. 3). With the locking pins 47 the adaptor 12 being aligned with the corresponding slits 90 adjacent the open upper end 76 of the sleeve 16, the outer sleeve assembly 14 is forcibly pushed upwardly so as to telescopingly receive in axial passage 74 the lower end 36 of the adaptor 12 with its O-ring attached so that the locking pins 47 are passed through the slits 90. This is because of the resiliency of the tabs 88 which are urged outwardly away from each other to permit entrance of the locking pins. Thereafter, the projections 88 spring resiliently back and the shoulders 88a thereof prevent subsequent complete removal of the outer sleeve assembly 14 from the adaptor 12. Finally, the outer sleeve assembly 14 is rotated approximately 30° in the clockwise direction until the locking pins snappingly engage the detents 92 so as to provide the locked position (FIG. 2).

In this locked position, the sealing surface 56 of the sealing washer 26, which has a diameter slightly larger than the inner diameter of the annular valve seat 40, is firmly and sealingly engaged with the annular valve seat so that no oil flows from the axial passage 34 of the adaptor 12. The wave washer 20 acting through the spool 24 creates a force on the sealing washer 26 to provide a spring-loaded seal against the annular valve seat 40. The closed or sealed position of the valve subassembly 22 is shown in FIG. 2.

Figure 14:
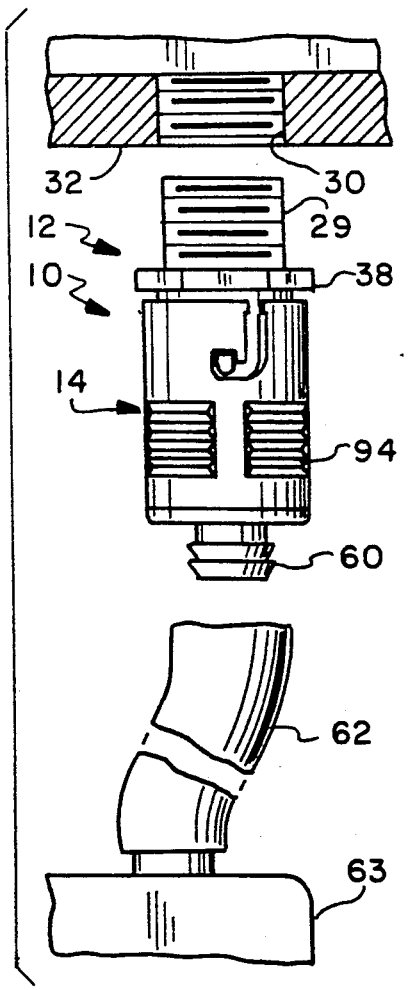
FIG. 14 is an exploded perspective view of the oil drain valve assembly of the present invention, illustrating its use for draining oil from an engine crankcase via a drain hose connected to a waste oil reservoir.
Figure 15:
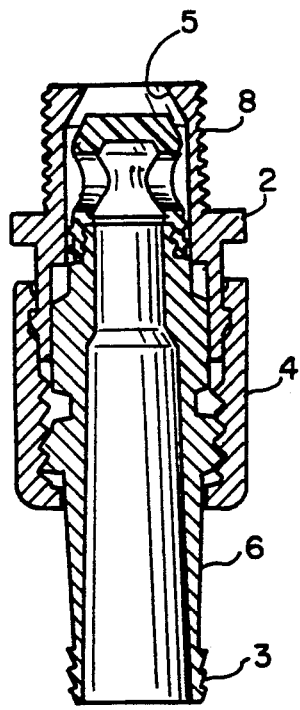
FIG. 15 is a cross-sectional view of an oil drain valve of the prior art.

In a most preferred embodiment illustrated in FIG. 14, the valve assembly 10 of the present invention is usually installed in the threaded outlet opening 30 when the crankcase has been drained of its waste oil. The valve assembly 10 can be easily installed by merely threading of the upper end 29 of the adaptor into the threaded outlet opening 30. Tightening of the adaptor is achieved by applying a tool such as a wrench to the hexagonal nut 38. As previously pointed out, one end of the drain hose may be attached to the barbs 60 of the nozzle end cap 18 to facilitate draining by directing draining oil from the crankcase. The other end of the drain hose 62 is attached to the waste oil reservoir 63 for collecting the waste oil and may then be emptied when draining has been completed.

When it is desired to drain the oil from the crankcase, the ribbed sections 94 on the circumference of the outer sleeve assembly is gripped by the fingers of the user. Then, the outer sleeve assembly is initially rotated approximately 30° in a counter-clockwise direction so as to disengage locking pins 47 from the detents 92 of the J-shaped slots 86. Thereafter, the outer sleeve assembly is pulled downwardly so as to retract the same away from the adaptor 12. The downward movement is limited by the projections 88 of the J-shaped slots 86 engaging the locking pins 47. Consequently, this will cause axial displacement of the valve subassembly 22, thereby separating the sealing surface 56 from the annular seat 40 as shown in the opened or draining position of FIG. 3. Therefore, the oil may flow from the axial passage 34 of the adaptor 12, around the sealing washer 26 and through the radial passageways 50 of the spool 22 into the axial bore 59 of the nozzle end cap 18. The oil flow path is shown by the direction of the arrow 96.

When draining of the waste oil has been finished, the valve subassembly 10 is closed by gripping the ribbed sections 94 of the sleeve 16 and then pushing upwardly the outer sleeve assembly 14. Thereafter, the outer sleeve assembly is rotated approximately 30° in the clockwise direction until the locking pins 57 on the adaptor 12 snappingly engage the detents 92 of the J-shaped slots 86. In this closed or sealed position shown in FIG. 2, the sealing washer 26 of the valve subassembly completely covers the axial passage 74 of the adaptor, thereby shutting off the passage of oil from the crankcase.

From the foregoing detailed description, it can thus be seen that the present invention provides an improved oil drain valve assembly which is simple in design and operation for draining engine oil from a small combustion engine without requiring the use of hand tools. The instant valve assembly includes adaptor threaded into a crankcase opening, an outer sleeve assembly having a valve subassembly, and interlocking means formed on the open upper end of the outer sleeve assembly and on the exterior surface of the adaptor for permitting opening of the valve assembly by relatively limited counter-clockwise rotation and subsequent pull of the outer sleeve assembly relative to the adaptor.

While there has been illustrated and described what is at present considered to be a preferred embodiment of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as the best mode contemplated for carrying out the invention, but that the invention will include all embodiments falling within the scope of the appended claims.

What is claimed is:

1. An oil drain valve assembly for draining oil from an engine crankcase such as in a small internal combustion engine, comprising:

an adaptor formed of a first tubular fitting member having an externally threaded male upper end to be received in an internally threaded outlet opening of the engine crankcase and having a first axial bore extending from the upper end to a lower end thereof, said lower end adjacent the first axial bore including an annular valve seat;

outer sleeve assembly formed of a second tubular member having open upper end and a lower end, said second tubular member including an axial passage extending between its open upper end and its lower end, said lower end of said second tubular member being closed by an integral nozzle end cap, said end cap having second axial bore extending therethrough;

said outer sleeve assembly further including a valve subassembly being secured in its lower end thereof, said valve subassembly having a sealing surface and radial passageways disposed below said sealing member and for communicating with said second axial bore;

the opened end of said second tubular member being adapted to telescopingly receive the lower end of said first tubular member so that the sealing surface fits firmly and tightly against the annular valve seat for providing a seal; and interlocking means formed on the open upper end of said second tubular member and on the exterior surface of said first tubular member for permitting opening of said valve subassembly by rotating and subsequently pulling of said second tubular member relative to said first tubular member so as to cause disengagement of said sealing surface from said annular valve seat thereby permitting oil to flow through said first axial bore, around said sealing surface into said radial passageways and from said second axial bore.

2. An oil drain valve assembly as claimed in claim 1, further comprising means formed on substantially the intermediate area of the exterior surface of said first tubular member and being adapted to cooperate with a tool for facilitating insertion and removal of said first tubular member by rotation thereof into said threaded outlet opening.

3. An oil drain valve assembly as claimed in claim 2, wherein said insertion and removal means comprises a hexagonal nut.

4. An oil drain valve assembly as claimed in claim 1, further comprising drain hose connecting means having a first end connected to said nozzle end cap for facilitating draining of the oil from the crankcase to a waste oil reservoir suitably disposed relative to a second end of said hose connecting means.

5. An oil drain valve assembly as claimed in claim 1, wherein said lower end of said first tubular member is provided with an O-ring of an elastomeric material disposed in a groove for preventing oil from escaping between the interior surface of said second tubular member and the exterior surface of said first tubular member.

6. An oil drain valve assembly as claimed in claim 1, wherein said first tubular member is formed of a non-corrosive metallic material such as zinc.

7. An oil drain valve assembly as claimed in claim 1, wherein said second tubular member and said nozzle end cap are formed of a thermoplastic material.

8. An oil drain valve assembly as claimed in claim 1, wherein said valve subassembly is formed of a spool and a sealing washer, said spool including an annular flange and a disc-shaped member spaced apart from said annular flange and joined integrally thereto by a plurality of radially extending legs, said legs defining therebetween said radial passageways, said sealing washer having a first surface secured against said disc-shaped member and having a second surface defining the sealing surface.

9. An oil drain valve assembly as claimed in claim 8, wherein said sealing washer is generally circular in shape and has a diameter slightly larger than the diameter of said first axial bore, said sealing washer being formed of an elastomeric material.

10. An oil drain valve assembly as claimed in claim 9, further comprising a wave washer disposed adjacent the lower end of said second tubular member between said nozzle end cap and said annular flange of said spool so as to act with said sealing washer to provide a spring-loaded seal against said annular valve seat.

11. An oil drain valve assembly as claimed in claim 1, wherein said interlocking means is comprised of a pair of diametrically opposed J-shaped slots formed on the open upper end of said second tubular member and co-mating locking pins formed on the exterior surface of said first tubular member for engagement with detents of said J-shaped slots to define the closed or sealed position.

12. An oil drain valve assembly as claimed in claim 1, further comprising a plurality of ribbed sections formed on the exterior surface of said second tubular member in substantially its intermediate area which may be gripped by a user for facilitating opening said valve assembly without the need of tools.

13. An oil drain valve assembly for draining oil from an engine crankcase such as in a small internal combustion engine, comprising:

an adaptor formed of a first tubular fitting member having an externally threaded male upper end to be received in an internally threaded outlet opening of the engine crankcase and having a first axial bore extending from the upper end to a lower end thereof, said lower end adjacent the first axial bore including an annular valve seat;

outer sleeve assembly formed of a second tubular member having open upper end and a lower end, said second tubular member including an axial passage extending between its open upper end and its lower end, said lower end of said second tubular member being closed by an integral nozzle end cap, said end cap having second axial bore extending therethrough;

said outer sleeve assembly further including a valve subassembly being secured in its lower end thereof, said valve subassembly having a sealing surface and radial passageways disposed below said sealing member and for communicating with said second axial bore;

the opened end of said second tubular member being adapted to telescopingly receive the lower end of said first tubular member so that the sealing surface fits firmly and tightly against the annular valve seat for providing a seal; and interlocking means formed on the open upper end of said second tubular member and on the exterior surface of said first tubular member for permitting opening of said valve subassembly by rotating approximately 30° in the counter-clockwise direction and subsequently pulling downwardly of said second tubular member relative to said first tubular member so as to cause disengagement of said sealing surface from said annular valve seat thereby permitting oil to flow through said first axial bore, around said sealing surface into said radial passageways and from said second axial bore.

14. An oil drain valve assembly as claimed in claim 13, wherein said valve subassembly is closed by pushing upwardly of said second tubular member relative to said first tubular member and subsequently rotating approximately 30° in the clockwise direction.

15. An oil drain valve assembly as claimed in claim 13, wherein said second tubular member and said nozzle end cap are formed of a thermoplastic material.

16. An oil drain valve assembly as claimed in claim 13, wherein said valve subassembly is formed of a spool and a sealing washer, said spool including an annular flange and a disc-shaped member spaced apart from said annular flange and joined integrally thereto by a plurality of radially extending legs, said legs defining therebetween said radial passageways, said sealing washer having a first surface secured against said disc-shaped member and having a second surface defining the sealing surface.

17. An oil drain valve assembly as claimed in claim 16, wherein said sealing washer is generally circular in shape and has a diameter slightly larger than the diameter of said first axial bore, said sealing washer being formed of an elastomeric material.

18. An oil drain valve assembly as claimed in claim 17, further comprising a wave washer disposed adjacent the lower end of said second tubular member between said nozzle end cap and said annular flange of said spool so as to act with said sealing washer to provide a spring-loaded seal against said annular valve seat.

19. An oil drain valve assembly as claimed in claim 13, wherein said interlocking means is comprised of a pair of diametrically opposed J-shaped slots formed on an open upper end of said second tubular member and co-mating locking pins formed on the exterior surface of said first tubular member for engagement with detents of said J-shaped slots to define the closed or sealed position.

20. An oil drain valve assembly as claimed in claim 13, further comprising a plurality of ribbed sections formed on the exterior surface of said second tubular member in substantially its intermediate area which may be gripped by a user for facilitating opening said valve assembly without the need of tools.

* * * * *